(12) United States Patent
Lu et al.

(10) Patent No.: US 10,194,308 B2
(45) Date of Patent: Jan. 29, 2019

(54) WIRELESS NETWORK ROAMING IN HIGH-SPEED MOVEMENT APPLICATIONS

(71) Applicant: Cisco Technology, Inc., San Jose, CA (US)

(72) Inventors: Linyu Lu, Shanghai (CN); Jun Liu, Shanghai (CN); Xia Ke, Shanghai (CN); Xiaoguang Jason Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 15/472,417

(22) Filed: Mar. 29, 2017

(65) Prior Publication Data

US 2018/0288602 A1  Oct. 4, 2018

(51) Int. Cl.
  *H04W 8/02* (2009.01)
  *H04W 12/06* (2009.01)
  *H04W 76/10* (2018.01)
  *H04W 92/10* (2009.01)

(52) U.S. Cl.
  CPC ............. *H04W 8/02* (2013.01); *H04W 12/06* (2013.01); *H04W 76/10* (2018.02); *H04W 92/10* (2013.01)

(58) Field of Classification Search
  CPC ....... H04W 8/02; H04W 76/10; H04W 12/06; H04W 92/10
  See application file for complete search history.

(56) References Cited

U.S. PATENT DOCUMENTS

| | | | |
|---|---|---|---|
| 6,452,910 B1 * | 9/2002 | Vij | H04L 12/66 370/310 |
| 8,000,298 B2 * | 8/2011 | Tsutsumi | H04W 36/08 370/328 |
| 8,934,420 B2 | 1/2015 | Sivaprakasam | |
| 9,491,001 B2 | 11/2016 | Meier | |
| 2011/0194532 A1 * | 8/2011 | Kakkad | H04W 36/30 370/331 |

(Continued)

OTHER PUBLICATIONS

"On-Board WiFi on Trains", WiFi on Trains, https://www.fluidmesh.com/solutions/on-board-wifi-for-trains/, Fluidmesh Network LLC, downloaded from the Internet on Feb. 13, 2017, 4 pages.

(Continued)

*Primary Examiner* — Habte Mered
(74) *Attorney, Agent, or Firm* — Edell, Shapiro, & Finnan, LLC

(57) ABSTRACT

An apparatus includes a first wireless bridge device configured to transmit signals to and receive signals from wireless network access points located along a pathway, and a second wireless bridge device configured to transmit signals to and receive signals from the wireless network access points. The first wireless bridge device and the second wireless bridge device are coupled to and communicate with each other. When the first wireless bridge device is wirelessly connected to a first access point and about to initiate a roaming mode to attempt to wirelessly connect to a second access point, the first wireless bridge device notifies the second wireless bridge device of the initiating of the roaming mode and determines whether the second wireless bridge device is in the roaming mode while the apparatus is moving along the pathway.

20 Claims, 9 Drawing Sheets

(56) References Cited

U.S. PATENT DOCUMENTS

| | | | |
|---|---|---|---|
| 2013/0022024 A1* | 1/2013 | Chu | H04W 36/0055 |
| | | | 370/332 |
| 2013/0148641 A1* | 6/2013 | Sivaprakasam | H04W 36/30 |
| | | | 370/338 |
| 2015/0078333 A1 | 3/2015 | Byers et al. | |
| 2015/0264614 A1* | 9/2015 | Stager | H04W 36/0061 |
| | | | 370/332 |

OTHER PUBLICATIONS

Patrick Mannion, "Startup's dual-radio IC opens door to roaming", May 31, 2004, http://www.embedded.com/electronics-news/4049086/Startup-s-dual-radi . . . , downloaded from the Internet on Feb. 13, 2017, 5 pages.

"Concurrent Dual-Radio Technology", Moxa Dual-Radio Technology, htp://www.moxa.com/Event/IW/2013/Zero/, Industrial Wireless LAN, downloaded from the internet on Feb. 13, 2017, 4 pages.

"Turotial: Roaming with a dual-radio client and PRP", htttps://www.lancom-systems.de/docs/LCOS-Refmanual/9.10-Rel/EN/Ref . . . , downloaded from the internet on Feb. 13, 2017, 3 pages.

* cited by examiner

WIRELESS NETWORK ROAMING IN HIGH-SPEED MOVEMENT APPLICATIONS

TECHNICAL FIELD

The present disclosure relates to a wireless network roaming in a high-speed movement applications.

BACKGROUND

When a vehicle, such as a bullet train, is moving at a high-speed, a wireless client device on the moving vehicle may face challenges maintaining wireless local area network connectivity. One of the goals in such high-speed environments is to minimize roaming latency and packet loss of a wireless client device.

DESCRIPTION OF EXAMPLE EMBODIMENTS

Overview

In one embodiment, an apparatus is provided that includes a first wireless bridge device configured to transmit signals to and receive signals from wireless network access points located along a pathway, and a second wireless bridge device configured to transmit signals to and receive signals from the wireless network access points. The first wireless bridge device and the second wireless bridge device are coupled to and communicate with each other. When the first wireless bridge device is wirelessly connected to a first access point and about to initiate a roaming mode to attempt to wirelessly connect to a second access point, the first wireless bridge device notifies the second wireless bridge device of the initiating of the roaming mode and determines whether the second wireless bridge device is in the roaming mode while the apparatus is moving along the pathway. A similar method and system and also presented herein.

Example Embodiments

Presented herein are an apparatus, system and method to reduce roaming latency and packet loss associated with a pair of wireless bridge devices (WBD) deployed on a moving object/apparatus (e.g., a vehicle) in a high-speed environment. The WBDs are also known in the art as wireless workgroup bridges (WGBs).

Figure 1:
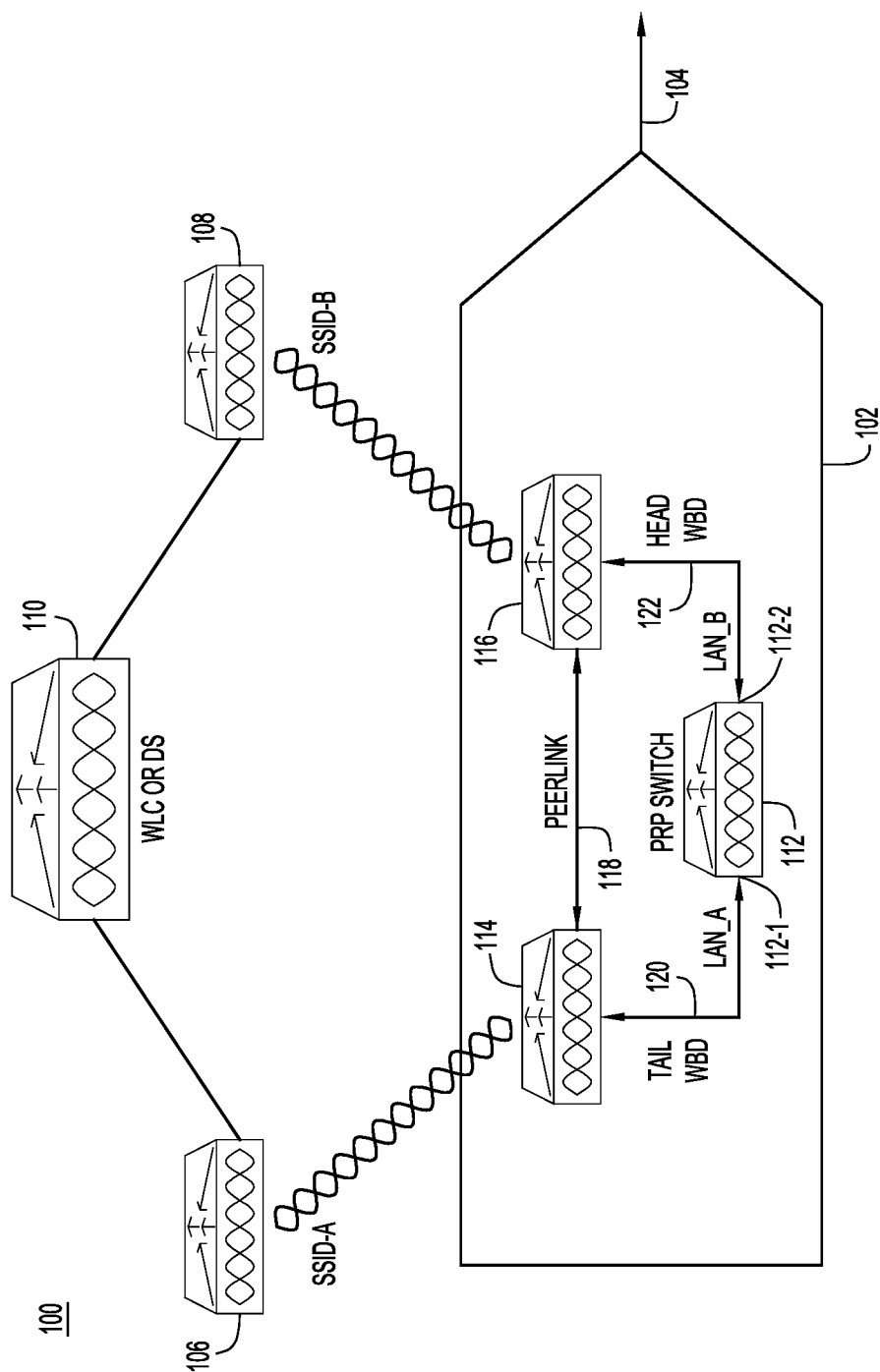
FIG. 1 depicts a block diagram of wireless network components on a moving object to enable roaming connectivity with wireless network infrastructure components outside of the moving object, according to an example embodiment.

FIG. 1 depicts a communication system 100 that enables roaming of wireless network components deployed in a moving apparatus according to an example embodiment. The system 100 includes a moving object, such as a vehicle 102, configured to move along a pathway 104, a first wireless access point (AP) 106, a second wireless AP 108, and an upstream traffic target 110. Each of the first wireless AP 106 and the second wireless AP 108 are connected, e.g., by a network connection, to the wireless LAN controller 110. The vehicle 102 further includes a parallel redundancy protocol (PRP) switch 112, a tail wireless bridge device (WBD) 114, and a head WBD 116, all of which are wire-connected to each other.

The tail WBD 114 and the head WBD 116 can communicate with each other through a peer link wired connection shown at reference numeral 118. In addition, the tail WBD 114 and the head WBD 116 can communicate to each other through the PRP switch 112 using connections 120 and 122. In one embodiment, the tail WBD 114 and the head WBD 116 use a "heartbeat" message to inform each other of their status.

In one embodiment, when the PRP switch 112 receives a data packet, it duplicates the data packet and forwards one data packet to each of the tail WBD 114 and head WBD 116. For example, the tail WBD 114 may be coupled to a PRP A port (LAN_A) 112-1 of the PRP switch 112 and the head WBD 116 may be coupled to a PRP B port (LAN_B) 112-2 of the PRP switch 112. Each of the tail WBD 114 and head WBD 116 in turn forwards the data packet to a connected AP. For example, the tail WBD 114 wirelessly forwards the data packet to the first AP 106 to which it is connected on service set identifier (SSID) denoted SSID_A, and the head WBD 116 wirelessly forwards the data packet to the second AP 108 to which it is connected on SSID_B. The APs 106 and 108 then forward the data packets to an upstream traffic target 110, such as a wireless LAN controller or distribution system (DS) network. This ensures that the upstream traffic target 110 receives at least one of the data packets from one of the wireless APs 106 or 108 when one of the wireless links between the first wireless AP 106 and the tail WBD 114 and between the second wireless AP 108 and the head WBD 116 is not functioning. For example, when one of the tail WBD 114 or the head WBD 116 is in a roaming mode, the other one of them can still transmit the data packet to the upstream traffic target 110 through one of the wireless APs.

Although two wireless APs 106 and 108 are shown in FIG. 1, more wireless APs may be disposed along the pathway 104 so that when the vehicle 102 is moving along the pathway 104, it can transmit signals to or receive signals from the wireless APs without a long latency or packet loss.

Figure 2:
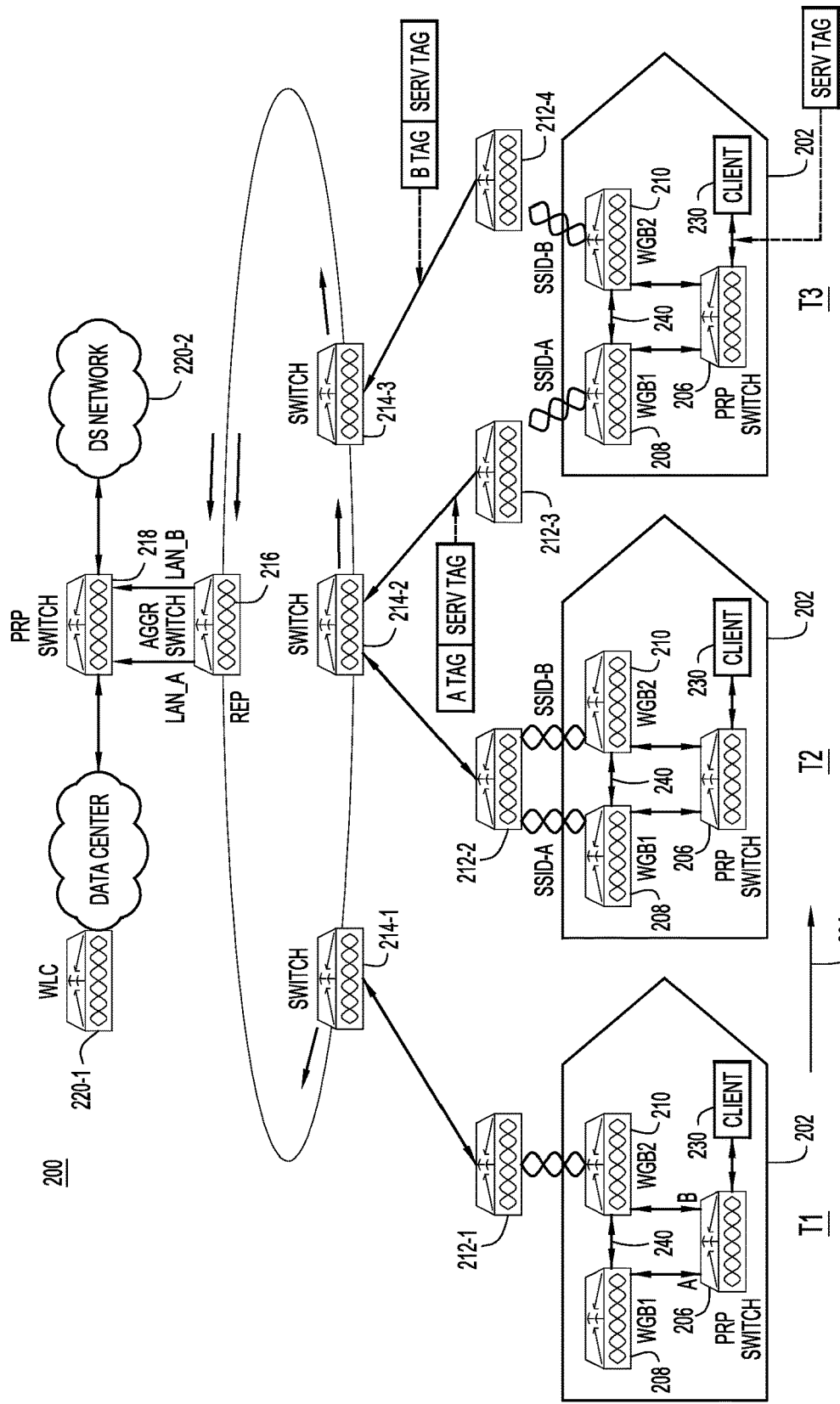
FIG. 2 depicts a more comprehensive block diagram of a system for enabling roaming of wireless network components on the moving object, according to an example embodiment.

FIG. 2 depicts a more comprehensive block diagram of a system 200 using the components depicted in FIG. 1, according to an example embodiment. The system 200 includes a vehicle 202 configured to move along a pathway 204. In one example, the vehicle is a train car, but this is only an example and it may be any other type of vehicle. The vehicle 202 includes a PRP switch 206, a tail WBD 208 (denoted WGB1) and a head WBD 210 (denoted WGB2), all of which are wire-connected to each other. As shown in FIG. 2, the tail WBD 208 and the head WBD 210 are physically separated from each other. The system 200 further includes a plurality of wireless APs 212-1, 212-2, 212-3, and 212-4 (collectively 212) disposed along the pathway 204. These wireless APs are part of a wireless network infrastructure and are configured to wirelessly transmit signals to and receive signals from the tail WBD 208 and the head WBD 210 when the vehicle 202 moves along the pathway 204. The wireless network infrastructure of the system 200 includes a plurality of switches 214-1, 214-2, and 214-3 (collectively 214) coupled to the wireless APs 212, an aggregation switch (Aggr Switch) 216, a PRP switch 218, which is connected to a upstream traffic target 220, e.g., a WLC 220-1 coupled to a data center or to a DS network 220-2.

The following embodiment explains how a data packet is transmitted from the vehicle 202 to APs positioned along the pathway 204 (e.g., along a railroad track) as the vehicle 202 moves along the pathway 204. When the PRP switch 206 receives a packet from a client device 230 behind the PRP switch 206 on the vehicle 202, the PRP switch 206 duplicates the packet. The packet may include a service tag (Serv Tag). Specifically, each of the tail WBD 208 and head WBD 210 receives one packet from the PRP switch 206. The PRP switch 206 forwards a packet to each of LAN_A port (denoted "A") and LAN_B port (denoted "B"), by adding a different PRP trailer into a frame. Because the tail WBG1 is connected to LAN_A port and head WBG2 is connected to LAN_B port, then those two packets can be forwarded by two different SSIDs by WGB1 and WGB2, respectively.

Still referring to FIG. 2, at time T1, the vehicle 202 moves towards the right in the figure. In this example, the head WBD 210 is connected to the wireless AP 212-1 while tail WBD 208 is roaming to connect to a wireless AP. Although the tail WBD 208 is not able to transmit the packet it receives from the PRP switch 206 at time T1 (since it is not wirelessly connected/associated to an AP as shown in FIG. 2), the head WBD 210 is wirelessly connected/associated to AP 212-1 and thus is able to transmit the packet to the wireless AP 212-1. The packet then can pass through switch 214-1, the aggregation switch 216, and the PRP switch 218 to reach the upstream traffic target 220-1 or 220-2. In one embodiment, a wireless AP can add a virtual LAN (VLAN) tag to the received packet based on the SSID of the packet it receives from a WBD. For example, in FIG. 2, based on the SSIDs of the respective packets the APs 212-3 and 212-4 add "A Tag" and "B Tag", respectively, to the packets they receive and forward the packets to the aggregate switch 216. When the aggregate switch 216 receives the packet, it maps the packet to a port of the PRP switch 218 based on the VLAN tag and removes the external VLAN tag, e.g., "A Tag" or "B Tag". For example, the aggregation switch 216 distributes an "A Tag" upstream packet to LAN_A port of the PRP switch 218 in the network infrastructure outside the vehicle and removes the external "A Tag." The aggregation switch 216 also distributes a "B Tag" upstream packet to LAN_B port of the PRP switch 218 and removes the external "B Tag." In this example, the PRP switch 218 receives only one packet because the tail WBD 208 is in a roaming mode and not connected to any wireless APs at time T1.

At time T2, the vehicle moves to location shown in the middle of the figure. At this point, the tail WBD 208 and the head WBD 210 are both wirelessly connected to the wireless AP 212-2. When the PRP switch 206 receives a packet, it duplicates the packet and transmits one packet to each of the tail WBD 208 and the head WBD 210. The PRP switch 206 may also add a different PRP trailer to each of the packet and the duplicated packet. The tail WBD 208 and the head WBD 210 then wirelessly transmit the respective packets they receive from the PRP switch 206 to the wireless AP 212-2 through two different networks, e.g., SSID_A and SSID_B. The wireless AP 212-2 adds different external VLAN tags to the respective packets it receives from WBD 208 and WBD 210 and forwards them to the aggregation switch 216. Upon receipt of the packets, the aggregation switch 216 maps the packets to different ports of the PRP switch 218 based on their external VLAN tags and removes the external VLAN tags from the packets. After the PRP switch 218-1 receives the two identical packets, it removes one of them, e.g., the duplicated packet, and forwards the remaining packet to the upstream traffic target 220-1 or 220-2.

At time T3, the vehicle 202 moves to a location to the right in the figure. In this example, the head WBD 210 is wirelessly connected/associated to the wireless AP 212-4 while the tail WBD 208 is wirelessly connected/associated to the wireless AP 212-3. As explained above, when the PRP switch 206 receives a packet, it duplicates the packet and transmits one packet to each of the tail WBD 208 and the head WBD 210. The tail WBD 208 and the head WBD 210 then wirelessly transmit the respective packets they receive to the wireless AP 212-3 and 212-4, respectively, through two different networks, e.g., SSID_A and SSID_B. The wireless AP 212-3 and 212-4 add different external VLAN tags to the packets and forward them to the aggregation switch 216. Upon receipt of the packets, the aggregation switches 216 maps them to different ports of the PRP switch 218 and removes the external VLAN tags from the packets. After the PRP switch 218 receives the two identical packets, it removes one of them, e.g., the duplicated packet, and forwards the remaining packet to the upstream traffic target 220-1 or 220-2.

In one embodiment, a downstream traffic can transmit a packet to the vehicle 202 in a similar way as explained above. That is, a pathway-side PRP switch 218 duplicates the packet and forwards the packets through two different networks to the vehicle 202. When the vehicle-side PRP switch 206 receives the packets, it removes one of them and sends the remaining packet to a client device 230 connected to the vehicle-side PRP switch 206. In one example, the aggregation switch 216 forwards the downstream packet received from LAN_A port of the PRP switch 218 in the network infrastructure outside the vehicle by adding an external VLAN tag, "A Tag." The aggregation switch 216 also forwards another downstream packet received from LAN_B port of the PRP switch 218 by adding an external VLAN tag, "B Tag." One or more APs 212 distribute the downstream packets to tail WBD 208 and the head WBD 210, respectively. The tail WBD 208 forwards the packet received from an AP 212 to LAN_A port of the PRP switch 206 on the vehicle 202. The head WBD 210 forwards a packet received from an AP 212 to LAN_B port of the PRP switch 206 on the vehicle 202.

As explained above, the present disclosure contemplates that the identical packets or at least one of the identical packets can be transmitted from the vehicle 202 to the wireless APs disposed along the pathway 204, or vice versa, to ensure transmission of packets despite one of the WBDs is in a roaming mode when the vehicle 202 is moving along the pathway 204. In one embodiment, the tail WBD 208 and head WBD 210 may roam independently. The physical separation of WBDs brings fault tolerance to wireless interference/noise, by which an end-to-end application can experience much smoother traffic than otherwise possible in a system having one WBD. Also, in a high-speed transportation scenario, traffic gaps caused by a WBD roaming can be reduced to a great extent because dual WBDs are roaming independently most of time.

In one embodiment, the tail WBD 208 and the head WBD 210 may coordinate with each other to perform staggered roaming. Staggered roaming means that only one of the tail WGD and head WBD will be roaming at any given time when the vehicle 202 is moving along the pathway 204. An example of staggered roaming will be explained below.

As shown in FIG. 2, the tail WBD 208 and head WBD 210 connect to each other through a wired connection 240 and keep each other alive by sending heartbeat messages. When one of the tail WBD 208 or head WBD 210 (e.g., tail WBD 208) is wirelessly connected to a first wireless AP, e.g., AP 212-3, and is about to initiate a roaming mode to attempt to wirelessly connect to a second AP, e.g., AP 212-4, the tail WBD 208 notifies the head WBD 210 that it is initiating the roaming mode and determines whether the head WBD 210 is in the roaming mode while the vehicle 202 is moving along the pathway 204. If the tail WBD 208 determines that the head WBD 210 is not in the roaming mode, the tail WBD 208 begins roaming to wirelessly connect to the AP 212-4. If the tail WBD 208 determines that the head WBD 210 is in the roaming mode, the tail WBD 208 remains connected to the AP 212-3 for a predetermined time period. After the predetermined time period elapses, the tail WBD 208 determines whether the head WBD 210 is still in the roaming mode. The tail WBD 208 may repeat the steps to remain connected until it receives a notification from the head WBD 210 indicating that the head WBD 210 is no longer in the roaming mode.

In some embodiments, after the predetermined time period elapses, the tail WBD 208 can assume the head WBD 210 is not in the roaming mode and begin its roaming to connect to the AP 212-4. After the tail WBD 208 finishes the roaming and is wirelessly connected to the AP 212-4, the tail WBD 208 sends to the head WBD 210 a notification indicating that it is no longer in the roaming mode.

This staggered roaming operation can be applied to Fast Transition (FT) roaming as included in the IEEE 802.11r protocol. The fast Basic Service Set (BSS) transition introduced in IEEE 802.11r is a way to reduce latency during handover by eliminating four-way Extensible Authentication Protocol (EAP) over LAN (EAPOL) key handshake messages. FT roaming uses a new keying hierarchy to enable an initial handshake with a new access point performed before a client roams to the target access point. However, the FT Request/Response messages are exchanged between the old AP and the wireless client, and may get lost because of bad signal quality during roaming. In a high-speed transportation scenario, this issue becomes even more severe and would cause a long roaming latency. Using the staggered roaming method explained above, each uplink roaming can use another wireless uplink of better quality to reliably perform authentication. The following explains in detail how staggered roaming is applied to FT roaming.

Figure 3A:
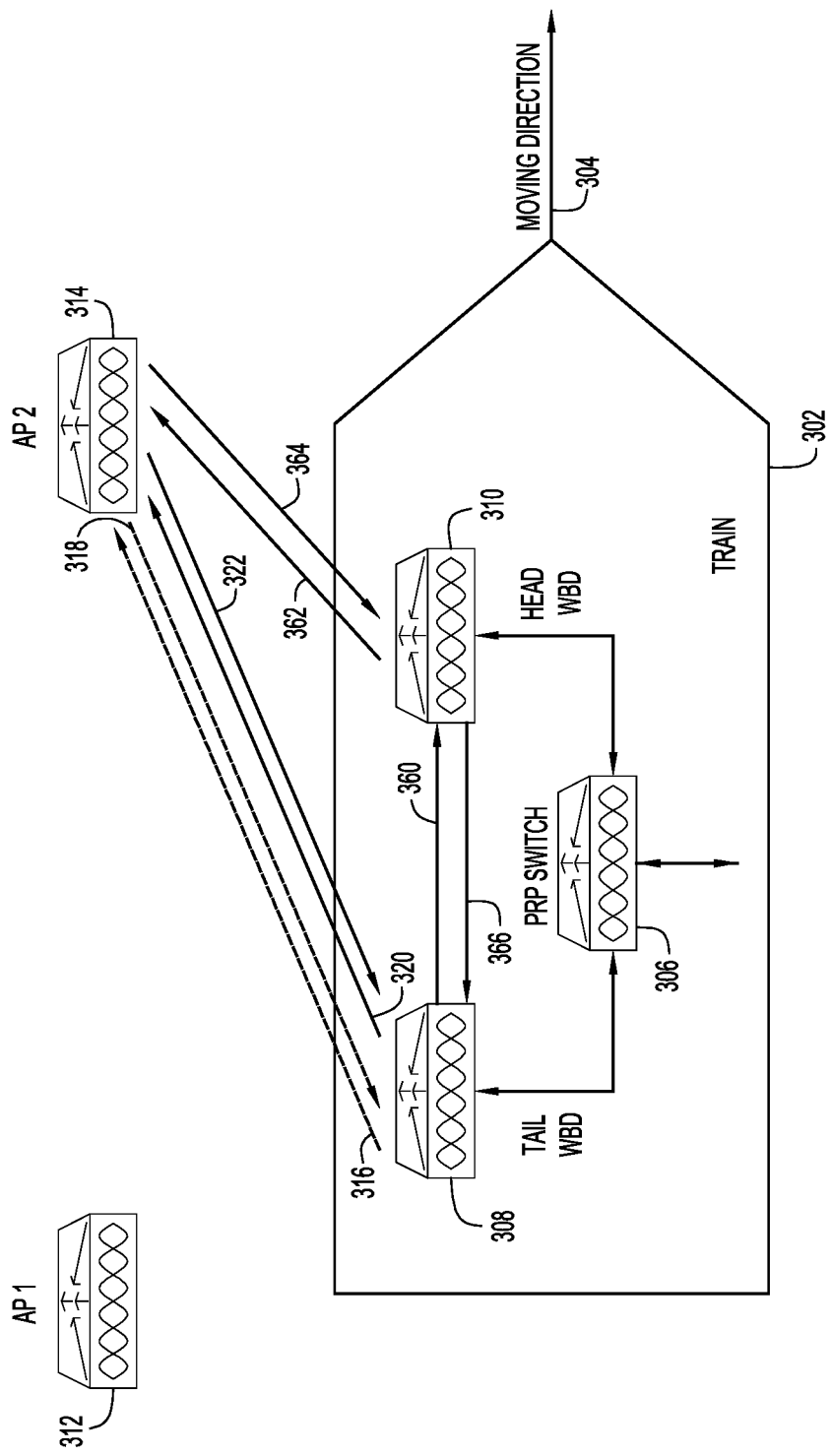
FIGS. 3A and 3B are diagrams illustrating a fast transition roaming procedure according to an example embodiment.

An over-the-air FT roaming scenario is illustrated in FIG. 3A. A vehicle 302 is moving along a pathway 304 and includes a PRP switch 306, a tail WBD 308, and a head WWBD 310, all of which are wire-connected to each other. The tail WBD 308 is wirelessly connected to a wireless AP1 312 while the head WBD 310 is wirelessly connected to a wireless AP2 314. In a conventional over-the-air FT roaming scheme, when the tail WBD 308 determines that it has to leave AP1 312 (current AP) and is about to connect to AP2 314 (target AP), the tail WBD 308 directly forwards an FT authentication request 316 to AP2 314 through a wireless link and directly receives an FT authentication response 318 from AP2 314 through the wireless link. Based on the FT authentication response, the tail WBD 308 wirelessly, directly forwards a reassociation request 320 to AP2 314, and wirelessly, directly receives a reassociation response 322 from AP2 314 so as to establish a wireless connection to AP2 314.

Figure 3B:
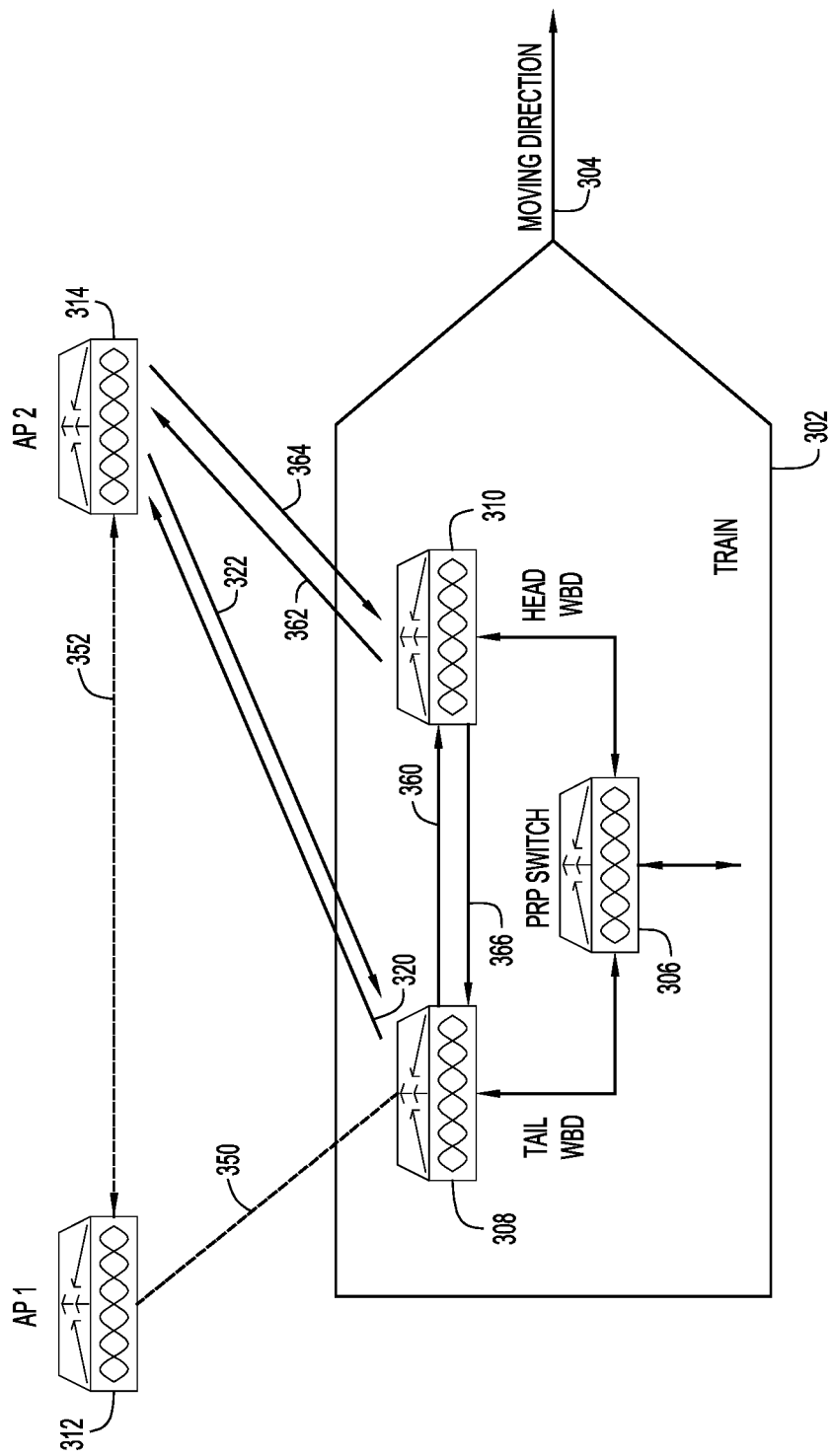

In another example, an over-the-distribution system (DS) FT roaming is illustrated in FIG. 3B. In a conventional over-the-DS FT roaming scheme, when the tail WBD 308 determines that it has to leave AP1 312 (current AP) and is about to connect to AP2 314 (target AP), the tail WBD 308 wirelessly forwards an FT request to AP1 312 through a link 350, which then forwards the FT request to AP2 314 through a link 352 in a distribution system including AP1 312 and AP2 314. Upon receipt of the FT request, AP2 314 returns an FT response to AP1 312 through the link 352, which then wirelessly forwards the authentication response to the tail WBD 308 through link 350. Based on the FT response, the tail WBD 308 wirelessly, directly forwards a reassociation request (link 320) to AP2 314 and wirelessly, directly receives a reassociation response (link 322) from AP2 314 so as to establish a wireless connection to AP2 314.

In one embodiment, an improved FT roaming is now explained with reference to FIGS. 3A and 3B. The tail WBD 308 is wirelessly connected to the wireless AP1 312 while the head WBD 310 is wirelessly connected to the wireless AP2 314. When the tail WBD 308 determines that it has to leave AP1 312 (current AP) and is about to connect to AP2 314 (target AP), the tail WBD 308 forwards an FT authentication request to the head WBD 310 through wired connection 360. The head WBD 310 then wirelessly forwards the FT authentication request at 362 to AP2 314. Upon receipt of the FT authentication request, AP2 314 wirelessly returns an FT authentication response at 364 to the head WBD 310, which then at 366 forwards the FT authentication response to the tail WBD 308. Based on the FT authentication response, the tail WBD 308 wirelessly, directly forwards a reassociation request 320 to AP2 314 and wirelessly, directly receives a reassociation response 322 from AP2 314 so as to establish a wireless connection to AP2 314.

In the illustrated embodiment, because the target AP (AP2 314) for the tail WBD 308 is still wirelessly connected to the head WBD 310 with good quality, the transmission of the FT authentication request from the tail WBD 308 to its target AP (AP2 314) and the transmission of the FT authentication response from AP2 314 to the tail WBD 308 are more reliable and effective while the vehicle 302 is moving along the pathway 304. This can improve success of exchanging authentication request and response between a WBD and its target AP. In another embodiment, the exchange of authentication request and response between a WBD and its target AP can be performed while the WBD is already in a roaming mode, e.g., the tail WBD 308 is no longer connected to from AP 1 312.

Figure 4:
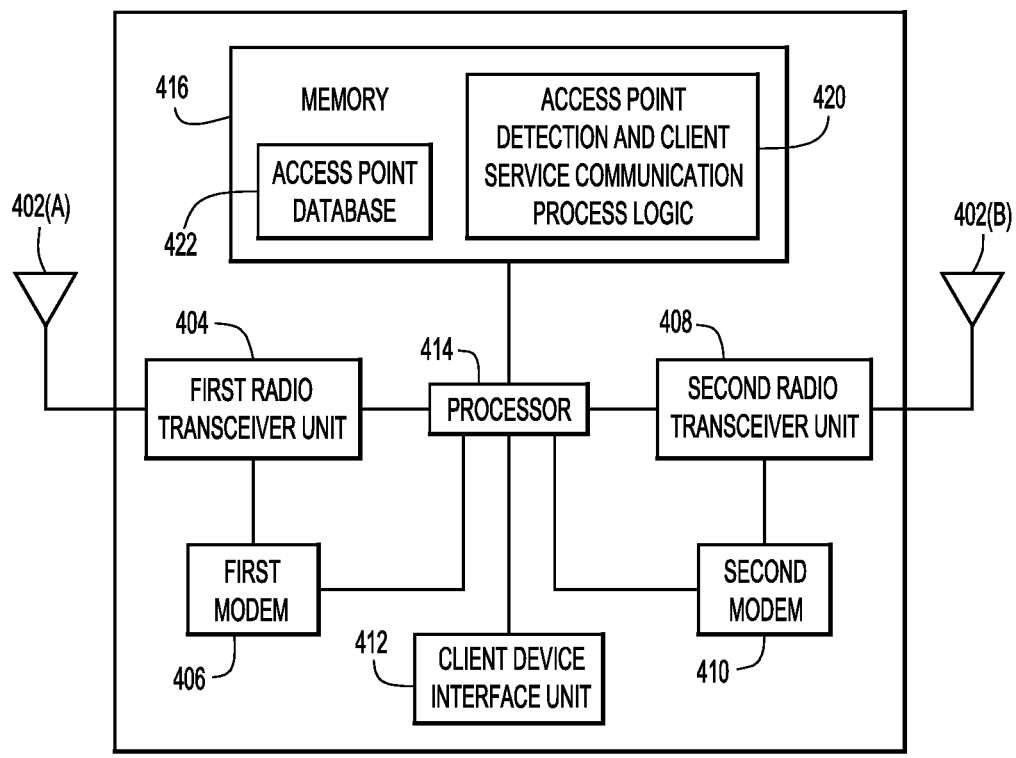
FIG. 4 is a block diagram of a wireless bridge device configured to participate in the processes presented herein, according to an example embodiment.

FIG. 4 illustrates an example block diagram of a wireless bridge device (WBD) 400. The WBD 400 includes antennas 402(A) and 402(B), a first radio transceiver unit 404, a first modem 406, a second radio transceiver unit 408, a second modem 410, a client device interface unit 412, a processor 414 and a memory 416. The first radio transceiver unit 404 is coupled to the first antenna 402(A) and to the first modem 406. The first radio transceiver unit 404 and the first modem 406 are coupled to the processor 414. In response to instructions from the processor 414, the first modem 406 generates signals for transmission by the first radio transceiver unit 404 and processes signals received by the first radio transceiver unit 404. The client device interface unit 412 is a network interface device (e.g., Ethernet card) that enables networked communications with the client devices, such as the PRP switches in FIGS. 1, 2, 3A, and 3B. Though the WBD 400 shows two radio transceiver units, it should be appreciated that the WBD 400 may comprise any number of radio transceiver units that operate on any number of frequency bands.

The second radio transceiver unit 408 is coupled to the antenna 402(B) and to the second modem 410. The second radio transceiver unit 408 and the second modem 410 are coupled to the processor 414. In response to instructions from the processor 414, the second radio transceiver unit 408 and the second modem 410 are controlled to operate in a manner similar to that of first radio transceiver unit 404 and first modem 406, but on a different frequency band. It should be appreciated that the radio transceiver unit 404 and the second radio transceiver unit 408 can communicate with both the client devices and the APs. The radio transceiver unit 404 and the modem 406 may be embodied in one or more integrated circuits, and the same applies to the second radio transceiver unit 408 and second modem 410.

The radio transceiver units 404 and 408 are configured to receive, via one or more of the antennas 402(A) and 402(B) downstream wireless communications from one or more APs. The radio transceiver units 404 and 408 are also configured to receive upstream communications from the client device interface unit 412 that is coupled to the processor 414. For example, a PRP switch transmits upstream communications that are received via the client device interface unit 412 which then supplies these upstream communications to one of the radio transceiver units 404 or 408. The radio transceiver units are configured to forward the upstream to an appropriate one or more of the APs, and the radio transceiver units are configured to forward downstream wireless communications (from one or more of the APs) to an appropriate one or more of the client devices, e.g., PRP switches, via the client device interface unit 412.

In FIG. 4, the processor 414 is a microprocessor or microcontroller that is configured to execute program logic instructions (i.e., software) for carrying out various operations and tasks described in this disclosure. For example, the processor 414 is configured to execute AP detection and client service communication process logic 420 that is stored in the memory 416 to provide communication services to the client devices and to scan a frequency band to detect APs in the network. The memory 416 may include read only memory (ROM), random access memory (RAM), magnetic disk storage media devices, optical storage media devices, flash memory devices, electrical, optical or other physical/tangible memory storage devices.

The functions of the processor 414 may be implemented by logic encoded in one or more tangible (non-transitory) computer-readable storage media (e.g., embedded logic such as an application specific integrated circuit, digital signal processor instructions, software that is executed by a processor, etc.), wherein the memory 416 stores data used for the operations described herein and stores software or processor executable instructions that are executed to carry out the operations described herein.

The AP detection and client service communications process logic 420 may take any of a variety of forms, so as to be encoded in one or more tangible computer readable memory media or storage device for execution, such as fixed logic or programmable logic (e.g., software/computer instructions executed by a processor), and the processor 414 may be an application specific integrated circuit (ASIC) that comprises fixed digital logic, or a combination thereof.

For example, the processor 414 may be embodied by digital logic gates in a fixed or programmable digital logic integrated circuit, which digital logic gates are configured to perform the AP detection and client service communication process logic 420. In general, the AP detection and client service communication process logic 420 may be embodied in one or more computer-readable storage media encoded with software comprising computer executable instructions and when the software is executed operable to perform the operations described herein for the process logic 420.

The memory 416 also stores data for an AP database 422. The AP database 422 stores priority and status information associated with the APs in the network. For example, as described herein, the AP database 422 may indicate the relative priority level of every detected AP in the network (e.g., corresponding to the signal strength between the WBD 400 and each of the APs) and may also indicate whether or not there is an active session (e.g., an active network session) between each of the APs and the WBD 400.

Figure 5:
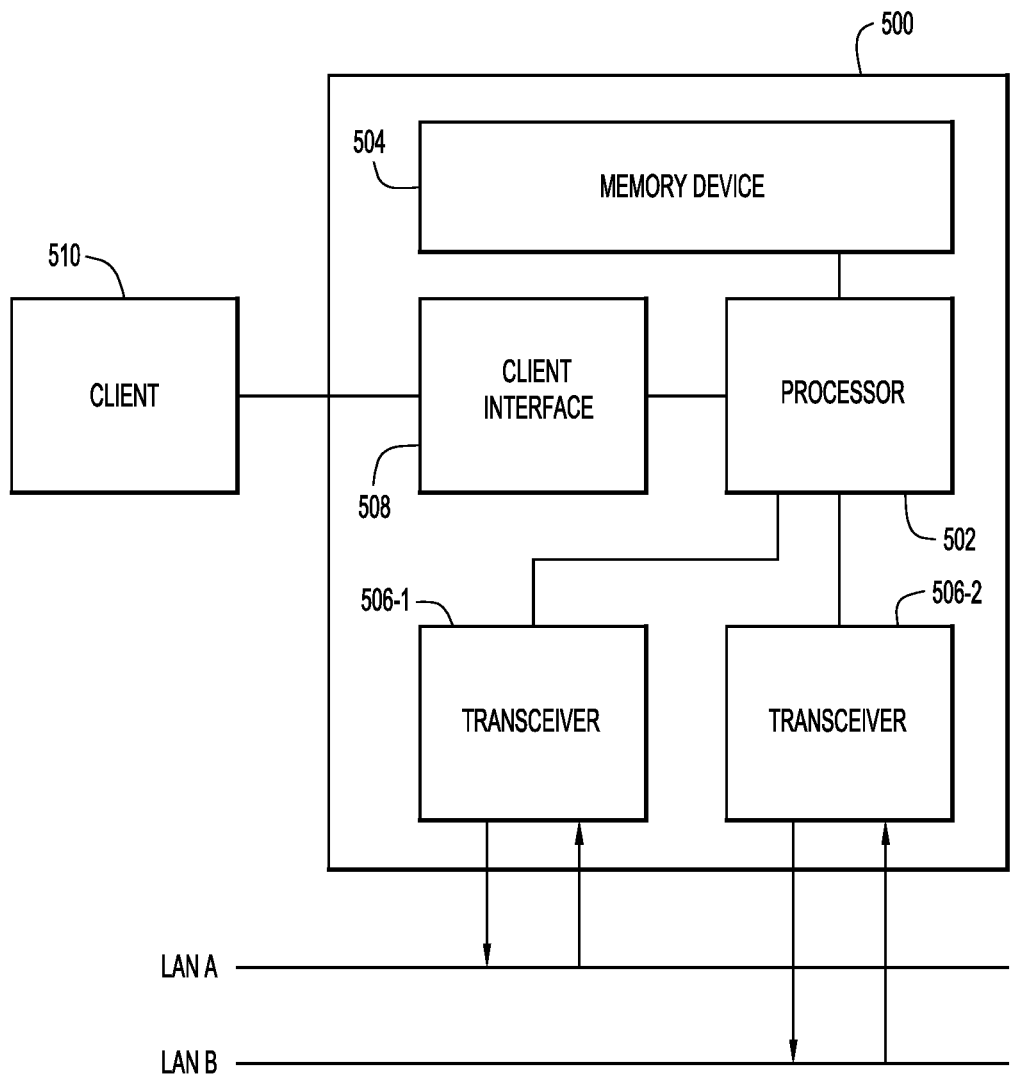
FIG. 5 is a block diagram of a parallel redundancy protocol switch configured to participate in the processes presented herein, according to an example embodiment.

FIG. 5 illustrates a block diagram of an example PRP switch 500 according to an example embodiment. The PRP switch 500 includes a processor 502, a memory device 504, two transceivers 506-1 and 506-2, and a client interface unit 508. The processor 502 is configured to execute instructions stored in the memory device 504 to control signal transmission and receive functions in the transceiver 506-1 and 506-2. In addition, the processor 502 is further configured to execute instructions stored in the memory device 504 to duplicate a packet received from a client. In one embodiment, the client interface 508 receives a packet from a client 510 through a wired or wireless connection. After duplicating the packet, the processor 502 may add different PRP trailers to the identical packets. For example, if a packet is to be sent through its LAN_A port, the trailer may include identification indicating network LAN_A. The processor 502 then controls the transceivers 506-1 and 506-2 to send the identical packets with different trailers to downstream devices, e.g., WBDs discussed above.

In another embodiment, when the transceivers 506-1 and 506-2 receive two PRP identical packets and forward them to the processor 502, the processor 502 is configured to remove one of the packets based on trailer and forwards the remaining packet after removing the trailer to an upstream client through client interface 508.

The memory 504 may include ROM, RAM, magnetic disk storage media devices, optical storage media devices, flash memory devices, electrical, optical or other physical/tangible memory storage devices. The memory 504 may store instruction executable by the processor 502 and other data necessary for the processor 502 to perform its functions.

Figure 6:
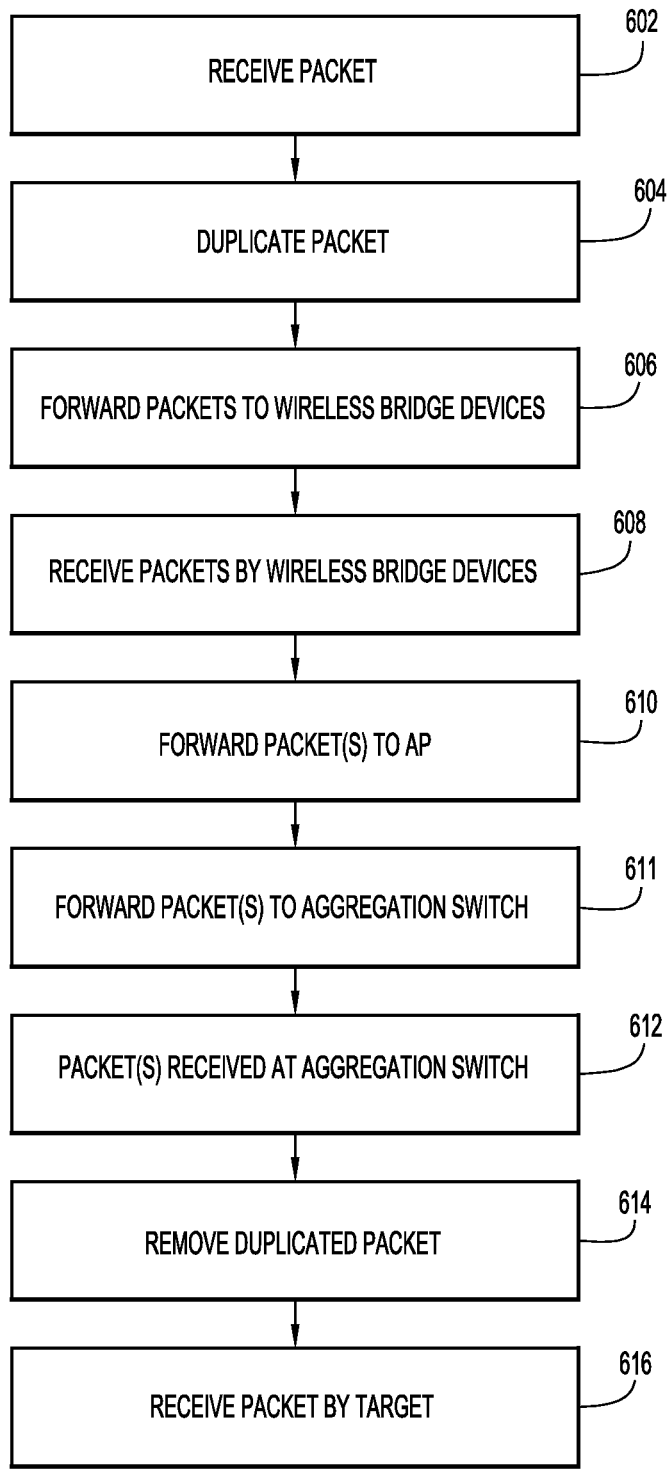
FIG. 6 is a flow chart of a method for wireless network components on the moving vehicle communicating with wireless network infrastructure equipment outside of the moving vehicle according to an example embodiment.

FIG. 6 is a flow chart depicting an example method 600 for communication between wireless network components on a moving vehicle and wireless network infrastructure equipment outside the moving vehicle, according to an example embodiment. A first PRP switch in the vehicle receives a packet at 602 and duplicates the packet at 604. At 606, the PRP switch adds different trailers, e.g., LAN_X, to the pair of identical packets and forwards them to WBDs in the vehicle. The WBDs in the vehicle are physically separated from each other. For example, the WBDs can be disposed at the head and tail portions of the vehicle, respectively. At 608, each of the WBDs receives a respective one of the two duplicate packets, and at 610, forwards the received packet to a wirelessly-connected/associated AP disposed along a pathway in which the vehicle is moving. In one embodiment, both packets arrive at different APs to which the respective WBDs are connected. In another embodiment, when one of the WBDs is wirelessly connected to an AP while another WBD is in a roaming mode attempting to wirelessly connect to an AP, only one packet arrives at the connected AP among a plurality of APs along the pathway.

At 611, one or more APs in the wireless network infrastructure outside of the moving vehicle that receive the packets through different LANs from the WBDs forward the packets to an aggregation switch coupled to the APs. At 612, one or both packets arrive at an aggregation switch in the wireless network infrastructure outside of the moving vehicle. In one embodiment, the aggregation switch may check the external tag (e.g., SSID_A or SSID_B) and map the received packets to different ports of a second PRP switch in the wireless network infrastructure outside the vehicle, and remove the external tags from the packets. At 614, when the second PRP switch receives two identical packets, it removes one of them, e.g., the duplicated packet, based on their trailers and sends the remaining packet to a wireless LAN controller. At 616, the packet arrives at a target (upstream traffic target). It is to be understood that the above procedure can be reversed to send a packet from the target to a moving vehicle.

Figure 7:
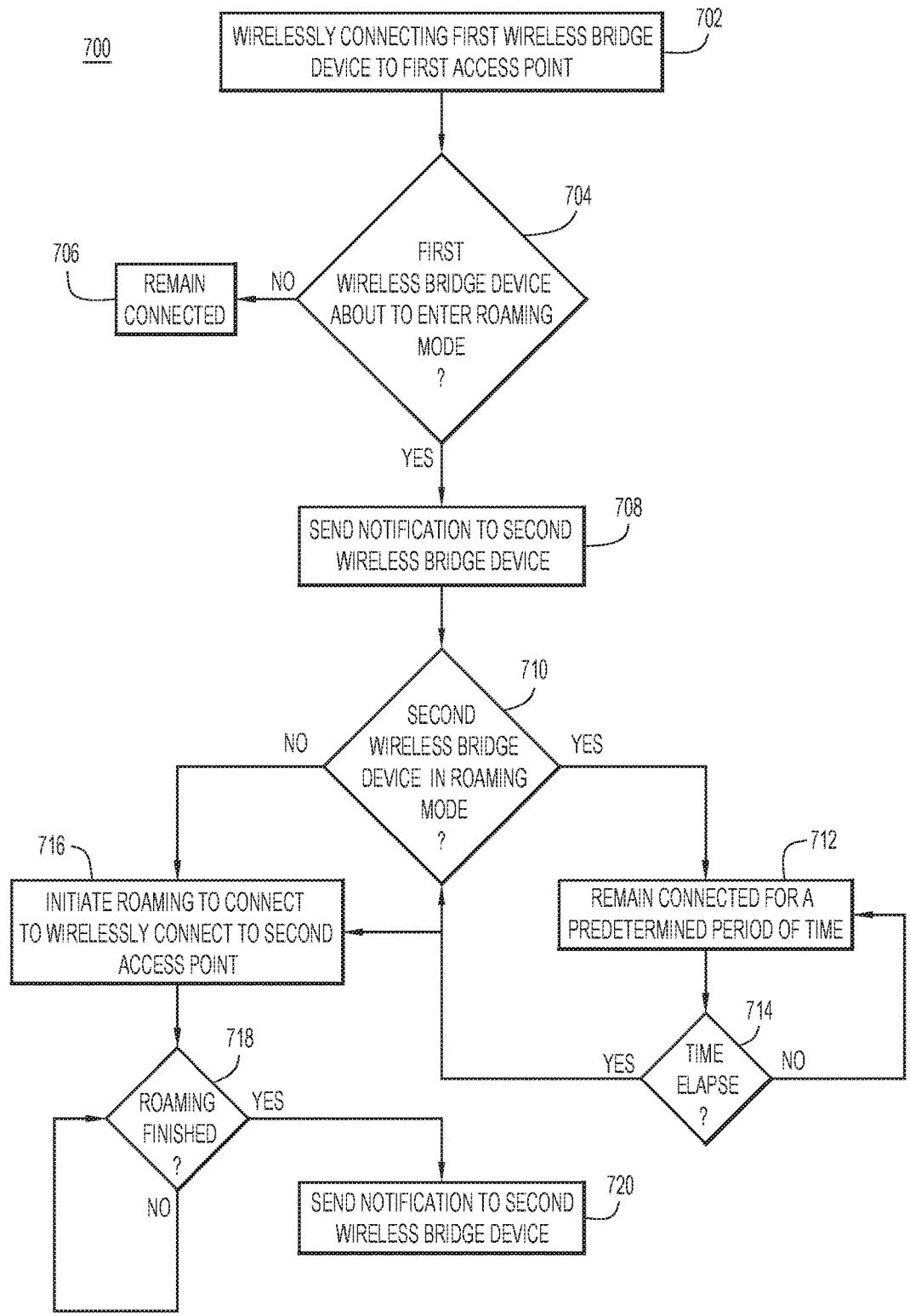
FIG. 7 is a flow chart of a method for performing staggered roaming in a moving object according to an example embodiment.

FIG. 7 is a flow chart illustrating a method 700 for a first WBD to perform roaming in an apparatus (vehicle) moving along a pathway. At 702, the first WBD wirelessly connects to a first AP among a plurality of APs disposed along the pathway. At 704, the first WBD determines whether it is about to enter a roaming mode to attempt to wirelessly connect to a second AP among the plurality of APs. If at 704 the first WBD determines it is not to enter the roaming mode, at 706 the first WBD remains connected to the first AP. If the first WBD determines that it is about to enter a roaming mode to connect to the second AP, at 708 it sends a notification to a second WBD indicating that the first WBD will initiate a roaming mode to attempt to connect to the second AP. The second WBD is also disposed on the moving apparatus but physically separated from the first WBD. Further, the first WBD determines whether the second WBD is in a roaming mode at 710. If the second WBD is in a roaming mode, at 712, the first WBD refrains from entering into the roaming mode and remains connected to the first AP for a predetermined period of time. At 714, the first WBD determines whether the predetermined period of time has elapsed. If not, the method 700 returns back to 712. When the predetermined period of time elapses (Yes at 712), the first WBD may have two options. In one embodiment, the first WBD may again determine whether the second WBD is in a roaming mode as at 710. In another embodiment, after the predetermined period of time elapses (Yes at 714), the first WBD may initiate roaming to wirelessly connect to the second AP at 716. If the first WBD determines that the second WBD is not in a roaming mode (No at 710), the first WBD initiates roaming to wirelessly connect to the second AP at 716. At 718, the first WBD determines whether it finishes roaming to wirelessly connect to the second AP. If so, the first WBD sends a notification to the second WBD indicating that it is no longer in the roaming mode at 720. This allows the second WBD to begin its roaming if it needs to do so.

It is understood that the sequence of the steps in method 700 may be modified without departing from the scope of this disclosure. For example, operations at 708 and 710 can be performed at the same time, or the operation at 710 can be performed before the operation at 708. The first WBD and the second WBD can connect to each other through a wire or wirelessly.

Figure 8:
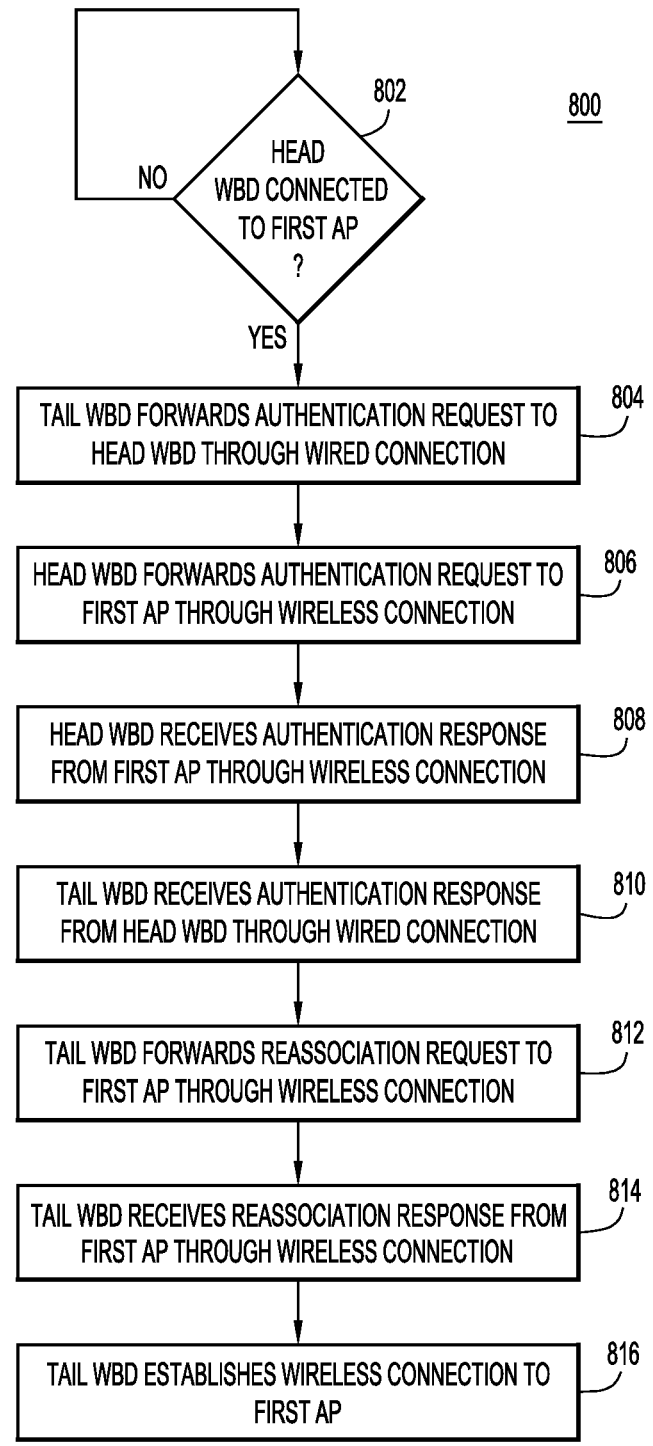
FIG. 8 is a flow chart of a method for conducting fast transition handshakes between wireless bridge devices in an apparatus moving along a pathway and a plurality of wireless access points disposed along the pathway, according to an example embodiment.

FIG. 8 is a flow chart illustrating a method 800 for conducting FT handshakes between WBDs disposed in an apparatus moving along a pathway and a plurality of APs disposed along the pathway. At least a head WBD and a tail WBD are in the apparatus and physically separated from each other. The head WBD and the tail WBD may communicate with each other through a wired connection. For example, the head WBD is disposed at a location near the head portion of the apparatus and the tail WBD is disposed at a location near the tail portion of the apparatus.

At 802, when the tail WBD determines that it needs to move from a currently-connected AP to a target AP, it first determines whether the head WBD is connected to the target AP. If so, at 804, the tail WBD forwards an authentication request to the head WBD through the wired connection between them. Upon receipt of the authentication request, at 806, the head WBD wirelessly forwards the authentication request to the target AP for its peer, i.e., the tail WBD, through the head WBD's connection to the target AP. At 808, the head WBD wirelessly receives an authentication response returned from the target AP. The head WBD then forwards the authentication response to the tail WBD through its wired connection with the tail WBD. At 810, the tail WBD receives the authentication response. Based on the authentication response, at 812, the tail WBD directly, wirelessly forwards a reassociation request to the target AP without going through the head WBD. At 814, the tail WBD wirelessly receives a reassociation response from the target AP, and establishes a wireless connection to the target AP at 816.

Presented herein are techniques in which two wireless bridge devices and a PRP switch can provide data redundancy and independency to wireless interference and noise. Coordination between the wireless bridge devices can improve this independency by staggered roaming and seamless roaming. This integrates parallel paths of wired line and wireless links, by which wired redundancy is extended to the wireless link. Lower roaming latency and zero packet loss can be achieved in a high-speed roaming environment without compromising performance of the wireless bridge devices. If one of radio link is degraded due to high-speed roaming, the traffic can still reach the destination by another radio link due to the independency of two radios on the respective wireless bridge devices. The staggered roaming process improve roaming latency in harsh wireless environments. No changes are needed to be made to the wireless communication standard, e.g., the IEEE 802.11 wireless standard, and these techniques work well with various enhancements to IEEE 802.11 for high-speed railway or other similar high-speed vehicle applications.

To summarize, in one form, an apparatus is provided comprising: a first wireless bridge device configured to transmit signals to and receive signals from wireless network access points located along a pathway; and a second wireless bridge device configured to transmit signals to and receive signals from the wireless network access points, the first wireless bridge device and the second wireless bridge device being coupled to and in communication with each other so that when the first wireless bridge device is wirelessly connected to a first access point and about to initiate a roaming mode to attempt to wirelessly connect to a second access point, the first wireless bridge device notifies the second wireless bridge device of the initiating of the roaming mode and determines whether the second wireless bridge device is in the roaming mode while the apparatus is moving along the pathway.

In another form, a system comprising: a plurality of wireless network access points disposed along a pathway; and an apparatus configured to be deployed on a vehicle that is to move along the pathway, the apparatus including: a first wireless bridge device configured to transmit signals to and receive signals from wireless network access points located along a pathway; and a second wireless bridge device configured to transmit signals to and receive signals from the wireless network access points, the first wireless bridge device and the second wireless bridge device being coupled to and communicating with each other so that when the first wireless bridge device is wirelessly connected to a first access point and about to initiate a roaming mode to attempt to wirelessly connect to a second access point, the first wireless bridge device notifies the second wireless bridge device of the initiating of the roaming mode and determines whether the second wireless bridge device is in the roaming mode while the apparatus is moving along the pathway; and an aggregation switch coupled to the plurality of access points to receive signals from or transmit signals to the apparatus through the plurality of access points while the apparatus is moving along the pathway.

In still another form, a method performed by an apparatus having a first wireless bridge device and a second wireless bridge device configured to transmit signals to and receive signals from wireless network access points located along a pathway, the first wireless bridge device and the second wireless bridge device being coupled to and communicating with each other, the method comprising: wirelessly connecting the first wireless bridge device to a first access point; and before the first wireless bridge device initiates a roaming mode to attempt to wirelessly connect to a second access point, the first wireless bridge device notifying the second wireless bridge device of the initiating of the roaming mode, and determining whether the second wireless bridge device is in the roaming mode while the apparatus is moving along the pathway.

The above description is intended by way of example only. Various modifications and structural changes may be made therein without departing from the scope of the concepts described herein and within the scope and range of equivalents of the claims.

What is claimed is:

1. An apparatus comprising:
a first wireless bridge device configured to transmit signals to and receive signals from wireless network access points located along a pathway; and
a second wireless bridge device configured to transmit signals to and receive signals from the wireless network access points,
the first wireless bridge device and the second wireless bridge device being coupled to and in communication with each other so that when the first wireless bridge device is wirelessly connected to a first access point and about to initiate a roaming mode to attempt to wirelessly connect to a second access point, the first wireless bridge device notifies the second wireless bridge device of the initiating of the roaming mode and determines whether the second wireless bridge device is in the roaming mode while the apparatus is moving along the pathway.

2. The apparatus of claim 1, further comprising:
a switch coupled to the first wireless bridge device and to the second wireless bridge device, the switch being configured to duplicate a packet and forward the packet and a duplicated packet to the first wireless bridge device and the second wireless bridge device, respectively,
wherein at least one of the first wireless bridge device and the second wireless bridge device wirelessly forwards the packet or the duplicated packet to at least one of the plurality of access points.

3. The apparatus of claim 1 wherein the first wireless bridge device and the second wireless bridge device are configured to have different Service Set Identifiers.

4. The apparatus of claim 1, wherein:
if the first wireless bridge device determines that the second wireless bridge device is not in the roaming mode, the first wireless bridge device begins roaming to wirelessly connect to the second access point; and
if the first wireless bridge device determines that the second wireless bridge device is in the roaming mode, the first wireless bridge device remains connected to the first access point for a predetermined time period, and after the predetermined time period elapses, the first wireless bridge device determines whether the second wireless bridge device is in the roaming mode.

5. The apparatus of claim 4, wherein after the first wireless bridge device finishes the roaming and is wirelessly connected to the second access point, the first wireless bridge device sends to the second wireless bridge device a notification indicating that the first wireless bridge device is no longer in the roaming mode.

6. The apparatus of claim 1, wherein:
when the first wireless bridge device is wirelessly connected to the first access point and the second wireless bridge device is roaming to wirelessly connect to the first access point, the second wireless bridge device forwards an authentication request to the first access point via the first wireless bridge device and receives an authentication response from the first access point via the first wireless bridge device; and
based on the authentication response, the second wireless bridge device forwards a reassociation request directly to the first access point and receives a reassociation response directly from the first access point so as to establish a wireless connection to the first access point.

7. The apparatus of claim 6, wherein:
the second wireless bridge device forwards the authentication request to the first wireless bridge device through a wired connection and the first wireless bridge device forwards the authentication request to the first access point through a wireless connection; and
the first wireless bridge device receives the authentication response from the first access point through the wireless connection and the second wireless bridge device receives the authentication response from the first bridge device through the wired connection.

8. A system comprising:
a plurality of wireless network access points disposed along a pathway; and
an apparatus configured to be deployed on a vehicle that is to move along the pathway, the apparatus including:
a first wireless bridge device configured to transmit signals to and receive signals from wireless network access points located along a pathway; and a second wireless bridge device configured to transmit signals to and receive signals from the wireless network access points, the first wireless bridge device and the second wireless bridge device being coupled to and communicating with each other so that when the first wireless bridge device is wirelessly connected to a first access point and about to initiate a roaming mode to attempt to wirelessly connect to a second access point, the first wireless bridge device notifies the second wireless bridge device of the initiating of the roaming mode and determines whether the second wireless bridge device is in the roaming mode while the apparatus is moving along the pathway; and an aggregation switch coupled to the plurality of access points to receive signals from or transmit signals to the apparatus through the plurality of access points while the apparatus is moving along the pathway.

9. The system of claim 8, wherein:

the apparatus further comprises a switch coupled to the first wireless bridge device and to the second wireless bridge device, the switch being configured to duplicate a packet and forward the packet and a duplicated packet to the first wireless bridge device and the second wireless bridge device, respectively; and at least one of the first wireless bridge device and the second wireless bridge device wirelessly forwards the packet or the duplicated packet to at least one of the plurality of access points.

10. The system of claim 8, wherein the first wireless bridge device and the second wireless bridge device are configured to have different Service Set Identifiers.

11. The system of claim 8, wherein:

if the first wireless bridge device determines that the second wireless bridge device is not in the roaming mode, the first wireless bridge device begins roaming to wirelessly connect to the second access point; and if the first wireless bridge device determines that the second wireless bridge device is in the roaming mode, the first wireless bridge device remains connected to the first access point for a predetermined time period, and after the predetermined time period elapses, the first wireless bridge device determines whether the second wireless bridge device is in the roaming mode.

12. The system of claim 11, wherein after the first wireless bridge device finishes the roaming and is wirelessly connected to the second access point, the first wireless bridge device sends to the second wireless bridge device a notification indicating that the first wireless bridge device is no longer in the roaming mode.

13. The system of claim 8, wherein:

when the first wireless bridge device is wirelessly connected to the first access point and the second wireless bridge device is roaming to wirelessly connect to the first access point, the second wireless bridge device forwards an authentication request to the first access point via the first wireless bridge device and receives an authentication response from the first access point via the first wireless bridge device; and based on the authentication response, the second wireless bridge device forwards a reassociation request directly to the first access point and receives a reassociation response directly from the first access point so as to establish a wireless connection to the first access point.

14. The system of claim 13, wherein:

the second wireless bridge device forwards the authentication request to the first wireless bridge device through a wired connection and the first wireless bridge device forwards the authentication request to the first access point through a wireless connection; and the first wireless bridge device receives the authentication response from the first access point through the wireless connection and the second wireless bridge device receives the authentication response from the first bridge device through the wired connection.

15. A method performed by an apparatus having a first wireless bridge device and a second wireless bridge device configured to transmit signals to and receive signals from wireless network access points located along a pathway, the first wireless bridge device and the second wireless bridge device being coupled to and communicating with each other, the method comprising:

wirelessly connecting the first wireless bridge device to a first access point; and before the first wireless bridge device initiates a roaming mode to attempt to wirelessly connect to a second access point, the first wireless bridge device notifying the second wireless bridge device of the initiating of the roaming mode, and determining whether the second wireless bridge device is in the roaming mode while the apparatus is moving along the pathway.

16. The method of claim 15, further comprising:

if the second wireless bridge device is not in the roaming mode, the first wireless bridge device initiating roaming to wirelessly connect to the second access point; and if the second wireless bridge device is in the roaming mode, the first wireless bridge device remaining connected to the first access point for a predetermined time period, and after the predetermined time period elapses, the first wireless bridge device determining whether the second wireless bridge device is in the roaming mode.

17. The method of claim 16, further comprising:

after the first wireless bridge device finishes the roaming and is connected to the second access point, the first wireless bridge device sending a notification to the second wireless bridge device indicating that first wireless bridge device is no longer in the roaming mode.

18. The method of claim 15, further comprising:

when the first wireless bridge device is wirelessly connected to the first access point and the second wireless bridge device is roaming to wirelessly connect to the first access point, the second wireless bridge device forwarding an authentication request to the first access point via the first wireless bridge device and receiving an authentication response from the first access point via the first wireless bridge device; and based on the authentication response, the second wireless bridge device forwarding a reassociation request directly to the first access point and receiving a reassociation response directly from the first access point so as to establish a wireless connection to the first access point.

19. The method of claim 18, further comprising:

the second wireless bridge device forwarding the authentication request to the first wireless bridge device through a wired connection and the first wireless bridge device forwarding the authentication request to the first access point through a wireless connection; and the first wireless bridge device receiving the authentication response from the first access point through the wireless connection and the second wireless bridge device receiving the authentication response from the first bridge device through the wired connection.

20. The method of claim 15, further comprising:
receiving a packet at a switch coupled to the first wireless bridge device and to the second wireless bridge device;
the switch duplicating the packet;
the switch forwarding the packet and a duplicated packet to the first wireless bridge device and the second wireless bridge device, respectively; and
at least one of the first wireless bridge device and the second wireless bridge device wirelessly forwarding the packet or the duplicated packet to at least one of the access points.

* * * * *